Feb. 11, 1958
M. SQUIRE ET AL
2,823,299
INSTRUMENT PANEL ILLUMINATOR
Filed Jan. 16, 1956
2 Sheets-Sheet 2
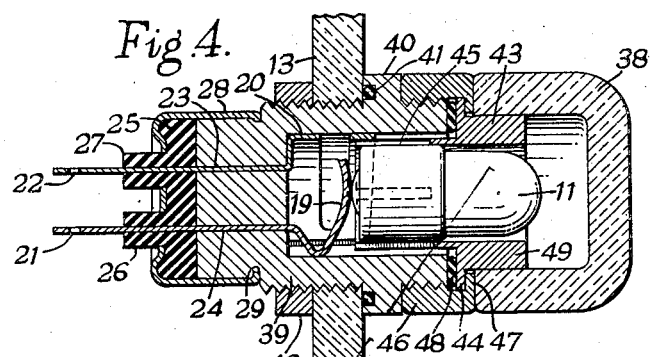
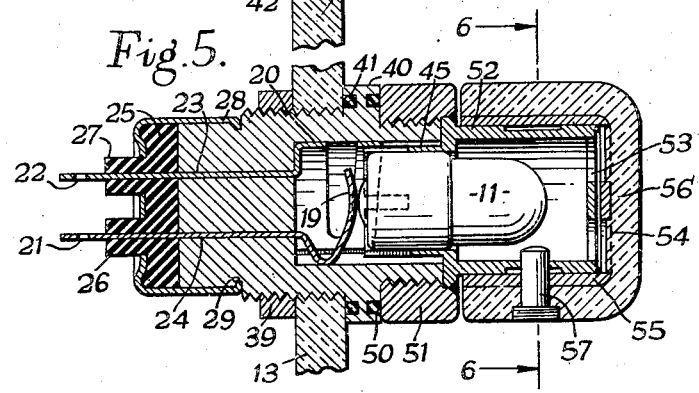
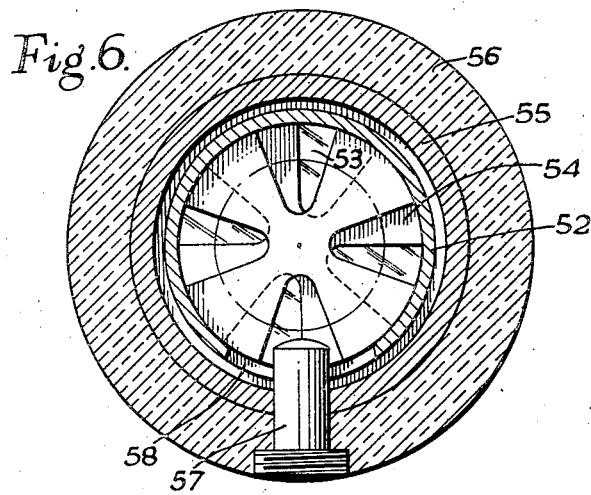
Bertram Stevens,
Major Squire,
Charles W. Turner,
INVENTORS
BY Hall + Houghton
ATTORNEY United States Patent Office 2,823,299
Patented Feb. 11, 1958

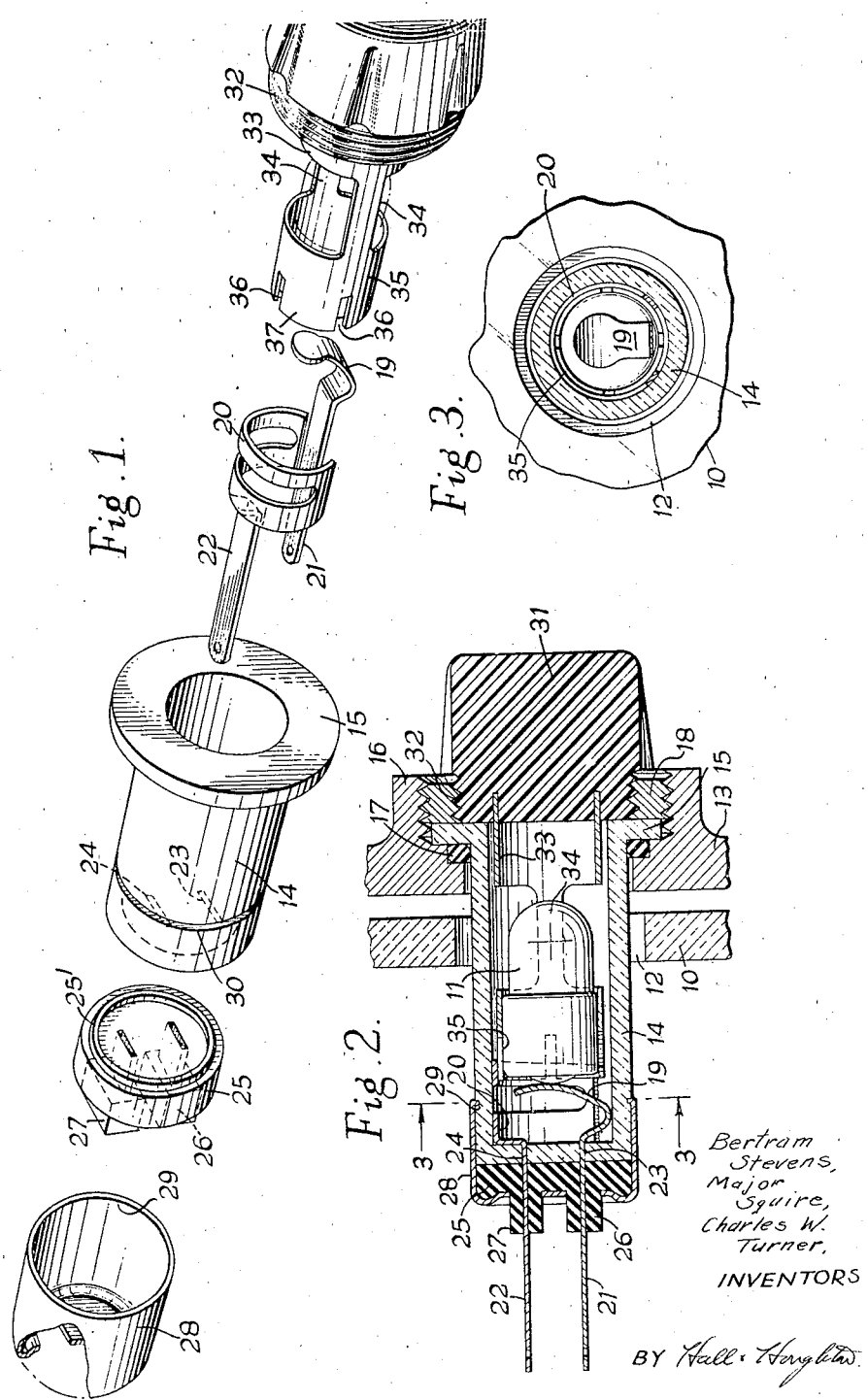

2,823,299

INSTRUMENT PANEL ILLUMINATOR

Major Squire, Friars Cliff, Christchurch, Charles Winton Turner, Bournemouth, and Bertram Stevens, North End, Durham, England, assignors to Thorn Electrical Industries Limited, London, England Application January 16, 1956, Serial No. 559,358

7 Claims. (Cl. 240—8.16)

The present invention relates to electric lamp fittings for illuminating panels and for like purposes.

A requirement exists for an electric lamp fitting which can be mounted in an aperture in a panel and which, when so mounted, provides a substantially hermetic seal of the two sides of the panel from one another through the aperture, and with which the electric lamp can be changed without breaking the aforesaid seal, and it is the principal object of this invention to provide a lamp fitting meeting these requirements.

According to the present invention, an electric lamp fitting comprises a hollow cylindrical casing having an outwardly-projecting flange adapted to be sealed by means of a washer around an aperture in a panel or the like, means being provided for fixing the casing in the said aperture and compressing the washer between the flange and a surface of the panel or the like, the casing being adapted for the insertion of a lamp through one end thereof to engage electric contacts within the casing, one or more electrical connecting means for making connection with one or more of the contacts passing out through the other end of the casing, and the latter end, including the aperture or apertures through which the connecting means pass, being sealed by means of a member of rubber or similarly compressible material.

The invention will be described by way of example with reference to the accompanying drawings in which Fig. 1 is an exploded view of one embodiment of the invention, Fig. 2 is a view in section of the embodiment of Fig. 1, mounted in an aperture in a panel, Fig. 3 is a view in section on the line 3—3 of Fig. 2, Figs. 4 and 5 are views similar to that of Fig. 2, showing modified forms of the invention, and Fig. 6 is an enlarged sectional view on the line 6—6 of Fig. 5.

Referring to Figs. 1 to 3, the embodiment there illustrated is for use for so-called edge illumination of a transparent panel 10 (Fig. 2), the fitting including a lamp 11 being passed through an aperture 12 in the panel 10. Light from the lamp is transmitted through the panel 10 by repeated internal reflection and can be made available in known manner at desired points in the surface of the panel 10. The transparent panel 10 is mounted behind a main panel 13 of the equipment. Devices such as instruments containing dials to be illuminated by light from the panel 10 are mounted in the panel 13, although such devices are not illustrated. The panel 13 is assumed to be a part of one wall of a closed container and it is one of the purposes of the embodiment to provide a lamp fitting such that the inside of the container, that is to say the part below the panel 13 in Fig. 2, is substantially hermetically sealed from the outside air, that is to say the space above the panel 13 in Fig. 2.

The fitting comprises a cylindrical casing 14 having a flange 15 at one end thereof. The casing 14 is of a suitable plastic which is light-transmitting and may have any desired color such for example as signal red. The flange 15 is located within a boss 16 projecting outwardly from the panel 13 and is sealed to the panel by means of a rubber washer 17. The flange 15 is firmly clamped to maintain the washer 17 in compression by means of an annular ring 18 threaded internally and externally, the external thread engaging in a corresponding thread in the boss 16. Within the casing 14 are two contact members 19 and 20 in the form of suitably bent strip metal. Extensions 21 and 22 respectively of the contact members pass through slots 23 and 24 formed in the bottom of the casing 14. In order to seal the base of the casing 14 and prevent leakage through the slots 23 and 24 there is provided a rubber sealing member 25 having projecting lugs 26 and 27. The strips 21 and 22 project through slots formed in the member 25. The rubber sealing member 25 is provided with an annular ridge 25'.

In order to retain the rubber sealing member 25 and compress and deform it in such a way as to provide the required seal, there is provided a metal cap 28 of generally cylindrical shape having its upper edge inwardly turned as indicated at 29. The edge 29 is crimped over to engage in a groove 30 (Fig. 1) in the casing 14 after the cap 28 has been pressed into position. The base of the cap 28 is apertured to pass the two lugs 26 and 27 and is upwardly dished as shown in Fig. 2. Thus when the cap 28 is pressed into position, pressure is exerted upon the member 25 in a region around the lugs 26 and 27 and close to these lugs. The lower surface of the member 25 which was previously flat is thus deformed as shown in Fig. 2, thereby achieving the desired compression of the sealing member around the strips 21 and 22. The ridge 25' also becomes flattened and provides a seal around the strips 21 and 22 against the base of the casing 14.

The lampholder comprises a knob 31 having a screw-thread 32 which engages in the internal thread of the annular ring 18. To the knob 31 is fixed a metal shell 33 the central part of which is cut away leaving portions 34 which are of ony sufficient width to give the structure sufficient strength. In this way the windows provided are as large as possible. The lower part of the member 33 is slotted at 36 in order to produce tongues 37 which can engage firmly the conducting side of a lamp, the conducting side constituting one terminal of the lamp.

When the lamp is to be inserted it is placed in position in the part 35 of the lampholder and the knob 31 is screwed into position. The part 35 then engages within and makes contact with the contact member 20 while the central contact of the lamp makes contact with the contact member 19. It is arranged that when the lamp is in position its filament is located opposite the centers of the windows in the shell 33 and in line with the medial plane of the transparent panel 10 in Fig. 2.

It will be evident that with the arrangement described the inside of the casing 14 is hermetically sealed from the inside of the container bounded by the panel 13 and moreover that the lampholder with its lamp can be removed without breaking the seal. With a pressure difference between the two sides of the panel 13 of 20 lbs. per square inch it has been found that leakages not exceeding 1 cc. per hour are obtainable.

In Figs. 4 to 6 like parts are given the same references as in Figs. 1 to 3. The arrangement shown in Fig. 4 is intended to emit light from a lamp 11 through a cup-shaped translucent member 38 which may be colored as desired. The casing in this case is also of insulating material and is indicated by the reference 39. The arrangements for sealing the base of the casing are the same as described in Figs. 1 to 3. The contacts 19 and 20 are also as previously described. The casing 39 is externally threaded to engage a threaded aperture in the panel 13 and has a flange 40 which engages the front face of the panel 13 and is sealed with respect thereto by a washer 41. The casing is locked in position by means of a lock nut 42. The lampholder 43 has a flange 44 and a portion 45 of similar construction to the portion 35 in Fig. 1, this portion serving to make contact with the outer cylindrical contact surface of the lamp 11 and also with the contact member 20. A knurled ring 46 having an inwardly-projecting flange 47 serves to clamp the flange 44 against the end of the casing 39, a washer 48 being interposed for sealing purposes. The translucent cover 38 is a push fit on the portion 49 of the member 43.

The arrangement of Figs. 5 and 6 differs from that of Fig. 4 in the following respects. The flange 40 of the casing 39 is provided, in addition to the washer 41, with a further inset washer 50 which is engaged by and sealed against a knurled ring 51 screwed on to the end of the casing 39. The metal member 52 corresponding to the member 43 in Fig. 4 is fixed as by welding to the knurled ring 51. The member 52 is provided at its ends with apertures 53 which co-operate with further apertures 54 formed in the end of a metal thimble 55 which is within a translucent cover 56 corresponding to the member 38 in Fig. 4. A pin 57 is fixedly mounted by screwing into the cover 56 and works in a slot 58 (Fig. 6) in the part 52, limited rotary movement of the cap 56 being thus permitted. In this way the degree of overlap of the apertures 53 and 54 can be adjusted and hence the light transmitted through the cover 56 can be adjusted by rotating the cover 56.

We claim:

1. An electric lamp fitting for panel mounting comprising a hollow light-pervious cylindrical casing for insertion into an aperture in the panel, said casing having an end through which a lamp can be completely inserted, an outwardly projecting flange on said casing, a sealing washer upon said flange, clamping means for said casing whereby said washer can be compressed between said flange and the panel, a contact within and insulated from said casing for making electrical contact with said lamp, a sealing member of compressible insulating material sealing the other end of said casing and having an aperture, and a connection from said contact and passing in a gas-tight manner through last mentioned aperture.

2. A lamp fitting according to claim 1, wherein said other end of said casing has a substantially flat sealing end face and said sealing member has a surface in sealing engagement with said end face.

3. A lamp fitting according to claim 2, wherein said surface has an annular projecting ridge extending around said last-mentioned aperture and engaging said end face.

4. An electric lamp fitting for panel mounting comprising a hollow cylindrical casing for insertion into an aperture in the panel, said casing having an end through which a lamp can be inserted, an outwardly projecting flange on said casing, a sealing washer upon said flange, clamping means for said casing whereby said washer can be compressed between said flange and the panel, a contact within and insulated from said casing for making electrical contact with said lamp, a sealing member having an aperture and being of compressible insulating material having a sealing surface in sealing engagement with the other end of said casing and on the side opposite to the sealing surface a projecting lug, said last-mentioned aperture extending through said lug, and electrical connecting means extending from within said casing through said aperture and making a gas-tight closure of said aperture.

5. A lamp fitting according to claim 4 comprising a cap fixed to said casing, extending over said sealing member, and deformed to close said last-mentioned aperture.

6. A lamp fitting according to claim 5, wherein said cap is inwardly dished around said lug to deform said sealing member and thereby close said last-mentioned aperture.

7. A lamp fitting according to claim 1 comprising a lamp holder detachably mounted within the said casing and having windows through which light from a lamp in the holder can pass to the casing, at least the parts of the casing opposite the windows being capable of transmitting light.

References Cited in the file of this patent

UNITED STATES PATENTS

| | | |
|---|---|---|
| 2,361,765 | Grimes | Oct. 31, 1944 |
| 2,396,998 | Garstang et al. | Mar. 19, 1946 |
| 2,677,045 | MacArthur | Apr. 27, 1954 |
| 2,681,980 | Harrington | June 22, 1954 |
| 2,705,308 | Howard | Mar. 29, 1955 |
| 2,718,636 | Harrington et al. | Sept. 20, 1955 |